(12) United States Patent
Tokuhisa

(10) Patent No.: US 8,780,946 B2
(45) Date of Patent: Jul. 15, 2014

(54) ULTRAVIOLET LASER DEVICE

(75) Inventor: Akira Tokuhisa, Tokyo (JP)

(73) Assignee: Nikon Corporation, Tokyo (JP)

( * ) Notice: Subject to any disclaimer, the term of this patent is extended or adjusted under 35 U.S.C. 154(b) by 17 days.

(21) Appl. No.: 13/704,835

(22) PCT Filed: Jun. 17, 2011

(86) PCT No.: PCT/JP2011/063889
§ 371 (c)(1),
(2), (4) Date: Mar. 7, 2013

(87) PCT Pub. No.: WO2011/158927
PCT Pub. Date: Dec. 22, 2011

(65) Prior Publication Data
US 2013/0170509 A1 Jul. 4, 2013

(30) Foreign Application Priority Data

Jun. 17, 2010 (JP) ................................. 2010-138115

(51) Int. Cl.
*H01S 3/30* (2006.01)
*H01S 3/067* (2006.01)
*H01S 3/109* (2006.01)
*H01S 3/16* (2006.01)
*H01S 3/00* (2006.01)

(52) U.S. Cl.
CPC ............. *H01S 3/067* (2013.01); *H01S 3/06716* (2013.01); *H01S 3/06754* (2013.01); *H01S 3/0677* (2013.01); *H01S 3/109* (2013.01); *H01S 3/1095* (2013.01); *H01S 3/1616* (2013.01); *H01S 3/1618* (2013.01); *H01S 3/0092* (2013.01)
USPC .......... 372/6; 372/4; 372/21; 372/22; 372/23; 372/28

(58) Field of Classification Search
CPC . H01S 3/067; H01S 3/06716; H01S 3/06754; H01S 3/0677; H01S 3/109; H01S 3/1095; H01S 3/1616; H01S 3/1618
USPC ....................................... 372/4, 6, 21, 22, 23
See application file for complete search history.

(56) References Cited

U.S. PATENT DOCUMENTS

| | | | |
|---|---|---|---|
| 2009/0185583 A1* | 7/2009 | Kuksenkov et al. | 372/5 |
| 2012/0026578 A1* | 2/2012 | Sakuma | 359/328 |
| 2013/0044768 A1* | 2/2013 | Ter-Mikirtychev | 372/5 |

FOREIGN PATENT DOCUMENTS

| | | |
|---|---|---|
| JP | A-2004-86193 | 3/2004 |
| JP | A-2007-279084 | 10/2007 |
| JP | A-2009-58782 | 3/2009 |
| JP | A-2010-93210 | 4/2010 |
| JP | B1-4590578 | 12/2010 |

OTHER PUBLICATIONS

International Search Report issued in International Patent Application No. PCT/JP2011/063889 dated Sep. 20, 2011.

* cited by examiner

*Primary Examiner* — Dung Nguyen
(74) *Attorney, Agent, or Firm* — Oliff, PLC

(57) ABSTRACT

An ultraviolet laser device equips a laser beam output unit that includes first, second and third amplifiers that output first through third infrared laser beams, and first through third optical systems into which the first through third infrared laser beams through which the first through third infrared laser beams are propagated. A wavelength conversion unit includes a fourth optical system into which the combined first through third laser beams are incident through which they are propagated. The first optical system wavelength converts and generates the first infrared laser beam to a predetermined harmonic wave as the first laser beam, the fourth optical system includes a first wavelength conversion element that generates an earlier stage ultraviolet laser beam between the predetermined harmonic wave and the second laser beam, and the second wavelength conversion element generates an ultraviolet laser beam between the earlier stage ultraviolet laser beam and the third laser beam.

7 Claims, 4 Drawing Sheets

ULTRAVIOLET LASER DEVICE

DESCRIPTION

1. Technical Field

The present invention relates to an ultraviolet laser device that includes a laser beam output unit that outputs a laser beam on an infrared wavelength using a fiber amplifier, and a wavelength conversion unit, including a wavelength conversion element, that wavelength converts the laser beam on an infrared wavelength outputted from the laser beam output unit to a laser beam on an ultraviolet wavelength.

2. Background Art

For example, an ultraviolet laser device including a laser beam output unit and a wavelength conversion unit as described above is per se known as a laser device that can appropriately be used in an exposure device, an inspection device, a therapy device or the like. This type of laser device amplifies a laser beam on an infrared wavelength that has been emitted by a laser beam source such as a DFB semiconductor laser or the like with a fiber amplifier, wavelength converts the amplified infrared laser beam with a wavelength conversion element that is provided in a wavelength conversion unit, and outputs a laser beam on an ultraviolet wavelength.

For historical reasons of optical fiber development, an erbium (Er) doped fiber amplifier (generally abbreviated as an "EDFA") that amplifies an infrared wavelength laser beam on the $\lambda=1.55$ µm wavelength band is widely used as a fiber amplifier. In a process in which an infrared laser beam outputted from an EDFA passes along the propagation paths of a plurality of systems that are provided to a wavelength conversion unit, laser beams of different wavelengths (a fundamental wave and a higher harmonic wave) are generated, these are combined at a later stage of the wavelength conversion unit, and an ultraviolet laser beam is outputted by sum frequency generation or the like (refer to Patent Document #1 and Patent Document #2). With this type of structure, an ultraviolet laser device of an all-solid type can be implemented that is simple and easy to handle and is compact.

CITATION LIST

Patent Literature

[Patent Document #1]: Japanese Laid-Open Patent Publication No. 2007-279084;
[Patent Document #2]: Japanese Laid-Open Patent Publication No. 2010-93210.

SUMMARY OF THE INVENTION

Technical Problems

However even if EDFAs are connected in multi-stage series or the like in order to increase the output of the infrared laser beam, the maximum output of the infrared laser beam obtained with the EDFAs that are connected in multi-stage series is around several tens of watts, and there has been the problem that it is difficult to increase the output of an ultraviolet laser device yet further. Furthermore, while various structures have been proposed for the wavelength conversion unit, it is considered that it is difficult to provide a structure that can make it possible to increase the wavelength conversion efficiency and to output an ultraviolet laser beam of higher output, without the provision of an optical element for beam profile shaping or the like in the ultraviolet wavelength region.

Solution to Problems

According to the first aspect of the present invention, an ultraviolet laser device, comprises: a laser beam output unit that includes a first fiber amplifier, a second fiber amplifier, and a third fiber amplifier that respectively output a first infrared laser beam, a second infrared laser beam, and a third infrared laser beam at infrared wavelengths; and a wavelength conversion unit that includes a first optical system into which the first infrared laser beam is incident and through which the first infrared laser beam is propagated and outputted as a first laser beam, a second optical system into which the second infrared laser beam is incident and through which it is propagated and outputted as a second laser beam, a third optical system into which the third infrared laser beam is incident and through which it is propagated and outputted as a third laser beam, and a fourth optical system into which the first laser beam, the second laser beam, and the third laser beam that have respectively been outputted from the first optical system, the second optical system, and the third optical system are incident after having been combined, and through which they are propagated, wherein: the first fiber amplifier is an ytterbium doped fiber amplifier; the second fiber amplifier is a thulium doped fiber amplifier; the third fiber amplifier is an ytterbium doped fiber amplifier or an erbium doped fiber amplifier; the first optical system wavelength converts the first infrared laser beam to a predetermined harmonic wave, and generates the predetermined harmonic wave as the first laser beam; the fourth optical system includes a first wavelength conversion element and a second wavelength conversion element; the first wavelength conversion element generates an earlier stage ultraviolet laser beam in the ultraviolet region by sum frequency generation between the predetermined harmonic wave and the second laser beam; and the second wavelength conversion element generates an ultraviolet laser beam by sum frequency generation between the earlier stage ultraviolet laser beam and the third laser beam.

According to the second aspect of the present invention, in the ultraviolet laser device of the first aspect, it is preferred that the third fiber amplifier is an ytterbium doped fiber amplifier.

According to the third aspect of the present invention, in the ultraviolet laser device of the first aspect, it is preferred that the third fiber amplifier is an erbium doped fiber amplifier.

According to the fourth aspect of the present invention, in the ultraviolet laser device of any one of the first through third aspect, it is preferred that the predetermined harmonic wave is a fourth harmonic wave whose angular frequency is four times that of the first infrared laser beam and whose wavelength is a quarter that of the first infrared laser beam.

According to the fifth aspect of the present invention, in the ultraviolet laser device of any one of the first through third aspect, it is preferred that the predetermined harmonic wave is a first third harmonic wave whose angular frequency is three times that of the first infrared laser beam and whose wavelength is a third that of the first infrared laser beam; the second optical system wavelength converts the second infrared laser beam into a second third harmonic wave whose angular frequency is three times that of the second infrared laser beam and whose wavelength is a third that of the second infrared laser beam, and generates the second third harmonic wave as the second laser beam; the first wavelength conversion element generates the earlier stage ultraviolet laser beam by sum frequency generation of the first third harmonic wave and the second third harmonic wave; and the second wavelength conversion element generates the ultraviolet laser beam by sum frequency generation of the earlier stage ultraviolet laser beam and the third laser beam.

According to the sixth aspect of the present invention, in the ultraviolet laser device of any one of the first through fourth aspect, it is preferred that the first wavelength conversion element is an LBO crystal; and the second wavelength conversion element is a CLBO crystal.

According to the seventh aspect of the present invention, in the ultraviolet laser device of any one of the first through third and fifth aspect, it is preferred that the first wavelength conversion element and the second wavelength conversion element are CLBO crystals.

Advantageous Effect of the Invention

According to the present invention, it is possible to provide an ultraviolet laser device that is capable of outputting an ultraviolet laser beam at high output. Moreover, it becomes possible to provide an ultraviolet laser device whose output can be increased without providing any optical element for mode waveform shaping in the ultraviolet wavelength region.

DESCRIPTION OF EMBODIMENTS

Figure 1:
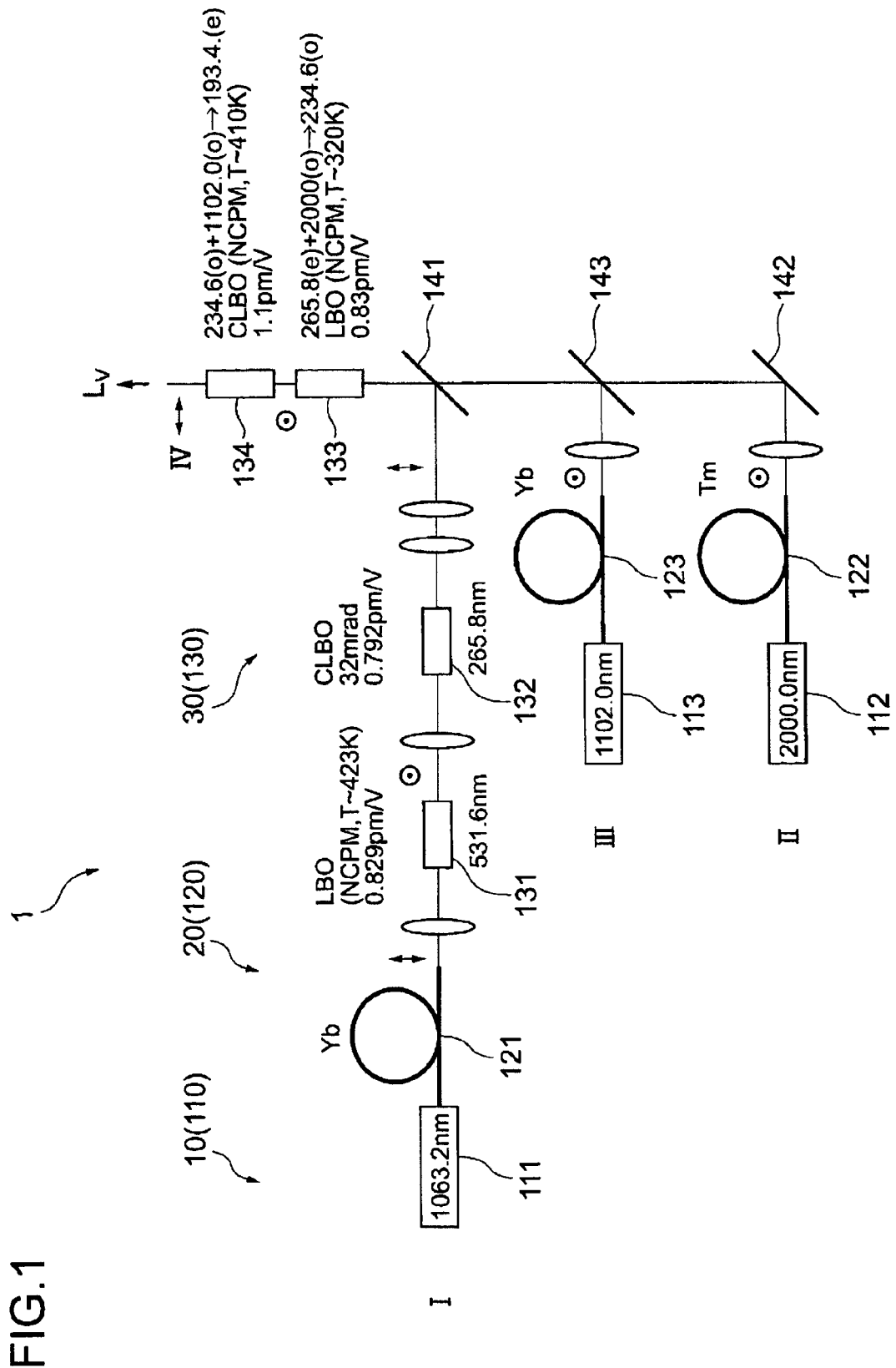
FIG. 1 is a figure showing, as an example, an outline of the structure of an ultraviolet laser device according to a first embodiment.

In the following, the present invention will be explained in terms of embodiments for its implementation, and with reference to the drawings. Ultraviolet laser devices 1 through 4 according to the first through the fourth embodiments of the present invention are shown in FIGS. 1 through 4 respectively. Each of these ultraviolet laser devices 1 through 4 includes laser beam output unit and wavelength conversion unit respectively. The laser beam output unit has fiber amplifier, and outputs laser beam of infrared wavelength. And the wavelength conversion unit has wavelength conversion element, and wavelength converts the laser beam of infrared wavelength outputted from the laser beam output unit to laser beam of ultraviolet wavelength, and that is outputted.

As shown in FIGS. 1 through 4, each of the laser beam output units includes laser beam generation unit 10 (110, 210, 310, 410) each of these generates laser beams (seed light beams) of predetermined wavelengths in the infrared region, and amplification units 20 (120, 220, 320, 420) each of these amplifies the seed light beams generated by the laser beam generation unit 10 and outputs infrared laser beams of predetermined output. It would also be acceptable to build the laser beam output unit using fiber laser in which resonator is installed at both end portions of fiber amplifier.

Each of the laser beam generation units 10 (110, 210, 310, 410) includes three laser beam sources: first laser beam source (111, 211, 311, 411), second laser beam source (112, 212, 312, 412), and third laser beam source (113, 213, 313, 413) respectively. Each of the first laser beam sources (111, 211, 311, 411), second laser beam sources (112, 212, 312, 412), and third laser beam sources (113, 213, 313, 413) generates a seed light beam of a predetermined wavelength in the infrared region.

Each of the amplification units 20 (120, 220, 320, 420) is built from three fiber amplifiers that are provided to correspond to the first through third laser beam sources. These three fiber amplifiers are first fiber amplifier (121, 221, 321, 421) that is provided to correspond to the first laser beam source, second fiber amplifier (122, 222, 322, 422) that is provided to correspond to the second laser beam source, and third fiber amplifier (123, 223, 323, 423) that is provided to correspond to the third laser beam source. The first fiber amplifier (121, 221, 321, 421) amplifies the seed light beam generated by the first laser beam source to predetermined output, and output laser beam of infrared wavelengths that has been amplified (termed the "first infrared laser beam"). The same holds for the second and third fiber amplifiers.

The first fiber amplifier (121, 221, 321, 421) is ytterbium (Yb) doped fiber amplifier, the second fiber amplifier (122, 222, 322, 422) is thulium (Tm) doped fiber amplifier, and the third fiber amplifier (123, 223, 323, 423) is ytterbium doped fiber amplifier or erbium doped fiber amplifier.

Each of the wavelength conversion units 30 (130, 230, 330, 430) includes three optical systems that are provided to correspond respectively to the first through the third fiber amplifiers, and an optical system in which these three optical systems come together into one. In other words, the wavelength conversion unit 30 (130, 230, 330, 430) has first optical system I upon that the first laser beam outputted from the first fiber amplifier is incident and through which that is propagated, second optical system II upon which the second laser beam outputted from the second fiber amplifier is incident and through which that is propagated, third optical system III upon which the third laser beam outputted from the third fiber amplifier is incident and through which that is propagated, and fourth optical system IV upon which the laser beams propagated through these first through third optical systems are incident and combined together and through which they are propagated.

Wavelength conversion is performed successively upon the first, second, and third infrared laser beams of infrared wavelength that are incident upon the first, second, and third optical systems by the wavelength conversion elements that are provided to the wavelength conversion unit 30, and ultraviolet laser beams Lv whose wavelengths is about 200 nm or less (i.e. deep ultraviolet laser beams) is outputted from the fourth optical system IV.

First wavelength conversion element and second wavelength conversion element are provided to the fourth optical system IV. Earlier stage ultraviolet laser beam in the ultraviolet region is generated by the first wavelength conversion element (133, 233, 333, 433) by sum frequency generation of the laser beam propagated through the first optical system I and the laser beam propagated through the second optical system II, and the ultraviolet laser beam Lv, i.e. the output light beam, is generated by the second wavelength conversion element (134, 234, 334, 344) by sum frequency generation of the above described earlier stage ultraviolet laser beam and the laser beam propagated through the third optical system III.

With each of the ultraviolet laser devices 1 through 4 having the above structure, for all of the first fiber amplifier and the second fiber amplifier, fiber amplifiers are used with which high output infrared laser beams of a hundred watts or more can be obtained comparatively simply and easily, and moreover these (the first fiber amplifier and the second fiber amplifier) are built using ytterbium doped fiber amplifier (hereinafter abbreviated as "YDFA") and thulium doped fiber amplifier (hereinafter abbreviated as "TDFA") that amplify laser beams having wavelengths that are greatly different, although they are both within the infrared wavelength region.

According to this type of structure, it is possible to provide an ultraviolet laser device that can greatly enhance the ultraviolet laser beam output, for which it has been considered to be difficult to increase the output because the limit has almost been reached. Moreover since, in addition to the fact that the wavelengths of the first and second infrared laser beams that are respectively outputted from the YDFA and TDFA are greatly different from one another, also YDFA or EDFA are used for the third fiber amplifier, accordingly it is possible to increase the freedom of construction of the wavelength conversion unit. Due to this, it is possible to provide ultraviolet laser devices of a plurality of types that are capable of providing increased output, without the incorporation of any optical elements for mode waveform shaping in the ultraviolet wavelength region.

In the following, the ultraviolet laser devices 1 through 4 described above will be explained in detail while more concrete examples of their structure are shown. For the states of light polarization at various positions upon the optical paths in each of FIGS. 1 through 4, a double arrow reference symbol denotes the polarization state in which the plane of polarization is parallel to the drawing paper, i.e. p polarized light, while a dotted circle reference symbol denotes the polarization state in which the plane of polarization is perpendicular to the drawing paper, i.e. s polarized light.

Embodiment #1

The ultraviolet laser device 1 of the first embodiment shown in FIG. 1 includes a laser beam generation unit 110 that generates seed light beams, an amplification unit 120 that amplifies the seed light beams generated by the laser beam generation unit 110 and outputs infrared laser beams of predetermined output, and a wavelength conversion unit 130 that wavelength converts the laser beams on infrared wavelengths outputted from the light amplification unit 120 into a laser beam on an ultraviolet wavelength, and this is then outputted.

The laser beam generation unit 110 includes a first laser beam source 111, a second laser beam source 112, and a third laser beam source 113. Each of the first laser beam source 111, the second laser beam source 112, and the third laser beam source 113 generates a seed light beam on an infrared wavelength. In this embodiment, the wavelength λ of the seed light beam generated by the first laser beam source 111 is λ=1063.2 nm, the wavelength λ of the seed light beam generated by the second laser beam source 112 is λ=2000 nm, and the wavelength λ of the seed light beam generated by the third laser beam source 113 is λ=1102 nm.

Each of the first laser beam source 111, the second laser beam source 112, and the third laser beam source 113 generates pulse modulated light by, for example, pulse modulating the injection current of a DFB (Distributed Feedback) semiconductor laser whose oscillation band above includes the respective wavelength described above, or by pulse modulating the injection current of a DBR (Distributed Bragg Reflector) semiconductor laser, or by pulse modulating the output beam of a narrow band fiber laser or a semiconductor laser that performs CW (continuous wave) oscillation with a high speed optical modulator such as an EOM (Electro-Optic Modulator) or the like.

The amplification unit 120 includes a first fiber amplifier 121 to the incident side of which the output of the first laser beam source 111 is connected, a second fiber amplifier 122 to the incident side of which the output of the second laser beam source 112 is connected, and a third fiber amplifier 123 to the incident side of which the output of the third laser beam source 113 is connected.

The first fiber amplifier 121 is an optical amplifier that amplifies the seed light beam of wavelength λ=1063.2 nm outputted from the first laser beam source 111. In concrete terms, a YDFA (ytterbium doped fiber amplifier) that has a high gain on this wavelength band and that is capable of outputting an infrared laser beam of high power is preferred for use as the first fiber amplifier 121. The first infrared laser beam of wavelength λ=1063.2 nm that has been amplified by the first fiber amplifier 121 is incident into the first optical system I of the wavelength conversion unit 130.

The second fiber amplifier 122 is an optical amplifier that amplifies the seed light beam of wavelength λ=2000 nm outputted from the second laser beam source 112. In concrete terms, a TDFA (thulium doped fiber amplifier) that has a high gain on this wavelength band and that is capable of outputting an infrared laser beam of high power is preferred for use as the second fiber amplifier 122. The second infrared laser beam of wavelength λ=2000 nm that has been amplified by the second fiber amplifier 122 is incident into the second optical system II of the wavelength conversion unit 130.

And the third fiber amplifier 123 is an optical amplifier that amplifies the seed light beam of wavelength λ=1102 nm outputted from the third laser beam source 113. In concrete terms, similarly to the case with the first fiber amplifier 121, a YDFA (ytterbium doped fiber amplifier) is preferred for use as the third fiber amplifier 123. The third infrared laser beam of wavelength λ=1102 nm that has been amplified by the third fiber amplifier 123 is incident into the third optical system III of the wavelength conversion unit 130.

While, in the explanation of this embodiment, the laser beam generation unit 110 and the amplification unit 120 have been explained separately on the basis of the functions possessed by the various parts thereof, as will be understood from the above explanation, the laser beam source and the fiber amplifier are integrally combined, and pair of them together constitutes laser beam output unit that output laser beam of predetermined wavelength. In other words: a first laser beam output unit that outputs a first infrared laser beam of wavelength λ=1063.2 nm is constituted by the first laser beam source 111 and the first fiber amplifier 121; a second laser beam output unit that outputs a second infrared laser beam of wavelength λ=2000 nm is constituted by the second laser beam source 112 and the second fiber amplifier 122; and a third laser beam output unit that outputs a third infrared laser beam of wavelength λ=1102 nm is constituted by the third laser beam source 113 and the third fiber amplifier 123. This situation is the same in the case of the other embodiments that are explained below as well.

The first infrared laser beam of wavelength λ=1063.2 nm that has been outputted from the first fiber amplifier 121 is incident into and is propagated through the first optical system I, and is outputted as the first laser beam. And the second infrared laser beam of wavelength λ=2000 nm that has been outputted from the second fiber amplifier 122 is incident into and is propagated through the second optical system II, and is outputted as the second laser beam. Moreover, the third infrared laser beam of wavelength λ=1102 nm that has been outputted from the third fiber amplifier is incident into and is propagated through the third optical system III, and is outputted as the third laser beam. The first through the third laser beams outputted from these first through third optical systems respectively are combined, and are incident into and are propagated through the fourth optical system IV. And the wavelength conversion unit 130 is constituted by the four optical systems, i.e. by the first optical system I, the second optical system II, the third optical system III, and the fourth optical system IV. The wavelength conversion unit 130 of this embodiment principally comprises four wavelength conversion elements 131 through 134. In FIG. 1, the elongated elliptical members that are shown as being provided upon the optical axes of the first through the third optical systems are cylindrical lenses for condensing the beams and bringing them to be incident upon the wavelength conversion elements; and the same is the case for FIGS. 2 through 4.

The third wavelength conversion element 131 and the fourth wavelength conversion element 132 are provided in the first optical system I. In the first optical system I, the first infrared laser beam of wavelength $\lambda=1063.2$ nm and angular frequency $\omega_1$ that is emitted from the first fiber amplifier 121 and is incident upon the first optical system (in the following, in the explanation of this embodiment, this is also sometimes termed the "first fundamental wave") is wavelength converted, by the process of being propagated through the first optical system, to its fourth harmonic wave that has angular frequency four times that of the first fundamental wave (i.e. $4\omega_1$) and wavelength one quarter of that thereof (i.e. $\lambda=265.8$ nm).

And the third wavelength conversion element 131 provided to the first optical system I wavelength converts the first fundamental wave of angular frequency $\omega_1$ (i.e. the first infrared laser beam) that is incident upon this element to its second harmonic wave whose angular frequency is $2\omega_1$. In this embodiment, an LBO ($LiB_3O_5$) crystal is used for the third wavelength conversion element 131, and is used with NCPM (Non-Critical Phase Matching) at a crystal temperature T of around 423 K. With this third wavelength conversion element 131, by second harmonic wave generation (SHG) of the first fundamental wave, the second harmonic wave is generated whose angular frequency is twice that of the first fundamental wave (i.e. $2\omega_1$) and whose wavelength is one half of that thereof (i.e. $\lambda=531.6$ nm). At this time, the effective non-linear optical constant $d_{eff}$ of the LBO crystal is high at $d_{eff}=0.829$ pm/V, so that the second harmonic wave of the first fundamental wave is generated at high efficiency. This second harmonic wave generated by the third wavelength conversion element 131 is condensed and is incident upon the fourth wavelength conversion element 132.

The fourth wavelength conversion element 132 wavelength converts the second harmonic wave of angular frequency $2\omega_1$ that is condensed and incident thereupon to the fourth harmonic wave whose angular frequency is $4\omega_1$. In this embodiment, a CLBO ($CsLiB_6O_{10}$) crystal is used for the fourth wavelength conversion element 132, and is used with Type I angular phase matching. By second harmonic wave generation of the second harmonic wave by this fourth wavelength conversion element 132, the fourth harmonic wave is generated whose angular frequency is four times that of the first fundamental wave (i.e. $4\omega_1$) and whose wavelength is one quarter of that thereof (i.e. $\lambda=265.8$ nm). At this time, the effective non-linear optical constant of the CLBO crystal is high at $d_{eff}=0.792$ pm/V, so that the fourth harmonic wave of the first fundamental wave is generated at high efficiency.

The fourth harmonic wave ($4\omega_1$) that has been generated by the fourth wavelength conversion element 132 is incident upon a dichroic mirror 141 after its beam shape has been waveform shaped by passing through two of the cylindrical lenses described above. The dichroic mirror 141 reflects the fourth harmonic wave of the first infrared laser beam of wavelength 265.8 nm, while passing the second infrared laser beam of wavelength 2000 nm and the third infrared laser beam of wavelength 1102 nm. And the fourth harmonic wave ($4\omega_1$) of the first infrared laser beam is reflected by the dichroic mirror 141, and is condensed and incident as the first laser beam upon the first wavelength conversion element 133 that is provided in the fourth optical system IV.

The transmission wavelength of the dichroic mirror 141 should be longer than the fourth harmonic wave ($4\omega_1$) of the first infrared laser beam, and may be any desired wavelength within the wavelength band that includes the wavelengths of the second and third infrared laser beams. For example, if a structure is adopted in which the transmission wavelength of the dichroic mirror 141 is set to be 350 nm or greater (i.e. the reflection wavelength is set to be less than 350 nm), so that the fundamental wave ($\omega_1$) of the first infrared laser beam and its second harmonic wave ($2\omega_1$) pass through the dichroic mirror 141 and are absorbed by an optical absorber, then it is possible to prevent laser beams of wavelengths that are not required from being incident upon the wavelength conversion element of the fourth optical system IV. The same holds for the embodiments described below.

The wavelength conversion unit 130 is built without providing any wavelength conversion element to the second optical system II upon which the second infrared laser beam is incident, and to the third optical system III upon which the third infrared beam is incident. A mirror 142 and a dichroic mirror 143 are provided at the final end portions of these optical systems. The dichroic mirror 143 is built to pass the second infrared laser beam of wavelength 2000 nm, while reflecting the third infrared laser beam of wavelength 1102 nm.

The second infrared laser beam that has been reflected by the mirror 142 passes through the dichroic mirror 143. And the third infrared laser beam is reflected by the dichroic mirror 143 and is superimposed over the second infrared laser beam on the same axis. Furthermore, the second and third infrared laser beams pass through the dichroic mirror 141. In this manner, the fourth harmonic wave of the first infrared laser beam (i.e. the first laser beam), the second infrared laser beam (i.e. the second laser beam), and the third infrared laser beam (i.e. the third laser beam) are condensed onto and are incident upon the first wavelength conversion element 133 of the fourth optical system IV, in the state of being superimposed upon the same axis.

The first wavelength conversion element 133 and the second wavelength conversion element 134 are provided to the fourth optical system IV. The three infrared laser beams, i.e. the fourth harmonic wave ($4\omega_1$) of wavelength $\lambda=265.8$ nm when the first infrared laser beam is wavelength converted by the process of being propagated through the first optical system I and is incident upon the fourth optical system, the second infrared laser beam of wavelength $\lambda=2000$ nm that is propagated through the second optical system and is incident upon the fourth optical system, and the third infrared laser beam of wavelength $\lambda=1102$ nm that is propagated through the third optical system and is incident upon the fourth optical system, are wavelength converted into an ultraviolet laser beam of wavelength $\lambda=193.4$ nm by the process of being propagated through the fourth optical system IV.

By sum frequency generation of the fourth harmonic wave of the first infrared laser beam and the second infrared laser beam, the first wavelength conversion element 133 that is provided to the fourth optical system IV generates an ultraviolet laser beam whose wavelength is in the ultraviolet region (in this specification, for convenience, this is termed the "earlier stage ultraviolet laser beam").

In this embodiment, an LBO crystal is used as the first wavelength conversion element 133, and is used with NCPM at a crystal temperature of approximately 320 K. An earlier stage ultraviolet laser beam of wavelength $\lambda$=234.6 nm is generated by the first wavelength conversion element 133 by sum frequency generation (SFG) of the fourth harmonic wave ($4\omega_1$) of the first infrared laser beam whose wavelength $\lambda$=265.8 nm, and the second infrared laser beam whose wavelength $\lambda$=2000 nm. At this time, the effective non-linear optical constant of the LBO crystal $d_{\mathit{eff}}$=0.83 pm/V, and this is high, so that the earlier stage ultraviolet laser beam of wavelength $\lambda$=234.6 nm is generated at high efficiency. The earlier stage ultraviolet laser beam that has been generated by the first wavelength conversion element 133 and the third infrared laser beam that has passed through the first wavelength conversion element 133 are incident upon the second wavelength conversion element 134.

And the second wavelength conversion element 134 generates an ultraviolet laser beam of wavelength 200 nm or less by sum frequency generation of the earlier stage ultraviolet laser beam and the third infrared laser beam. In this embodiment, a CLBO crystal is used as the second wavelength conversion element 134, and this is used with NCPM at a crystal temperature of around 410 K. And an ultraviolet laser beam of wavelength $\lambda$=193.4 nm is generated by the second wavelength conversion element 134 by sum frequency generation (SFG) of the earlier stage ultraviolet laser beam whose wavelength $\lambda$=234.6 nm, and the third infrared laser beam whose wavelength $\lambda$=1102 nm. At this time, the effective non-linear optical constant $d_{\mathit{eff}}$ of the CLBO crystal $d_{\mathit{eff}}$=1.11 pm/V, and this is extremely high, so that the ultraviolet laser beam of wavelength $\lambda$=193.4 nm is generated at high efficiency.

The ultraviolet laser beam of wavelength $\lambda$=193.4 nm generated by the second wavelength conversion element 134 is outputted at the final end of the fourth optical system. Thus, an ultraviolet laser beam Lv of wavelength $\lambda$=193.4 nm (i.e. a deep ultraviolet laser beam), that is of approximately the same wavelength as that of an ArF excimer laser, is outputted from the wavelength conversion unit 130 (i.e. from the ultraviolet laser device 1).

With the ultraviolet laser device 1 having the structure described above, in addition to the fundamental beneficial effects described above, the following beneficial effects are also obtained. First, in this embodiment, each of the three fiber amplifiers 121 through 123 (i.e. the first through the third fiber amplifiers) that amplify the infrared laser beams is implemented as a YDFA and a TDFA that is capable of outputting an infrared laser beam of high power. Due to this, it is possible to implement great increase of the output of this all-solid type ultraviolet laser device that outputs an ultraviolet laser beam of wavelength 193 nm.

Furthermore, with the ultraviolet laser device 1 of this embodiment, the first and second wavelength conversion elements (LBO crystal and CLBO crystal) 133 and 134 for generating the ultraviolet laser beam are used with NCPM, with which neither suffers walk-off. Due to this, wavelength conversion is performed by the wavelength conversion unit 130 at extremely high efficiency, and moreover a high beam quality is obtained. Yet further, it is not necessary to provide any optical element for beam profile shaping to the fourth optical system that generates and outputs a laser beam in the deep ultraviolet region.

Embodiment #2

Figure 2:
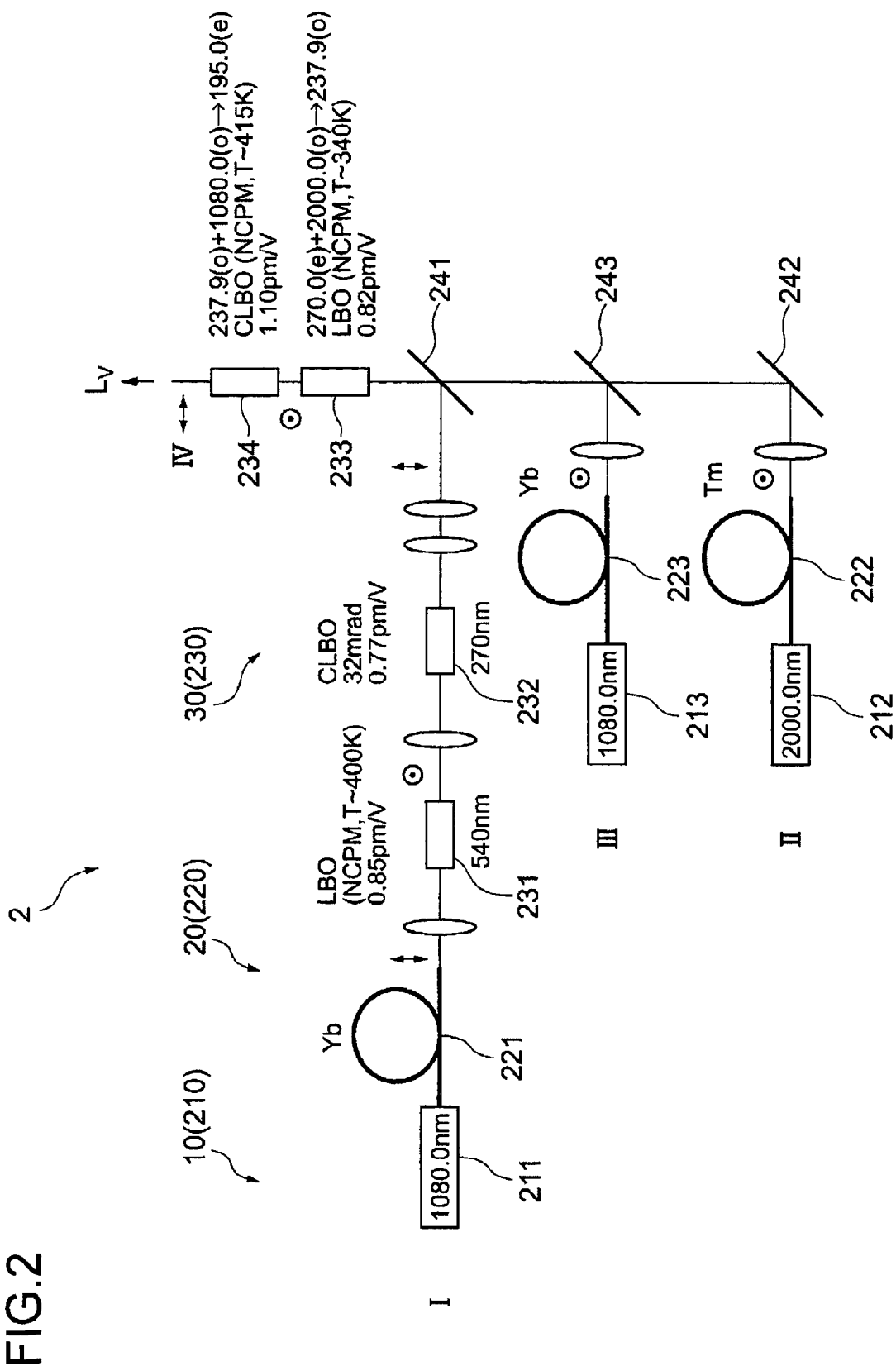
FIG. 2 is a figure showing, as an example, an outline of the structure of an ultraviolet laser device according to a second embodiment.

An ultraviolet laser device 2 of a second embodiment will now be described with reference to FIG. 2. This ultraviolet laser device 2 includes a laser beam generation unit 210 that generates seed light beams, an amplification unit 220 that amplifies the seed light beams generated by the laser beam generation unit 210 and outputs infrared laser beams of predetermined output, and a wavelength conversion unit 230 that wavelength converts the laser beams on infrared wavelengths outputted from the light amplification unit 220 into a laser beam on an ultraviolet wavelength, and this is then outputted.

The laser beam generation unit 210 includes a first laser beam source 211, a second laser beam source 212, and a third laser beam source 213. Each of the first laser beam source 211, the second laser beam source 212, and the third laser beam source 213 generates a seed light beam on an infrared wavelength. In this embodiment, the wavelength $\lambda$ of the seed light beam generated by the first laser beam source 211 is $\lambda$=1080 nm, the wavelength $\lambda$ of the seed light beam generated by the second laser beam source 212 is $\lambda$=2000 nm, and the wavelength $\lambda$ of the seed light beam generated by the third laser beam source 213 is $\lambda$=1080 nm.

In the same manner as in the first embodiment, each of the first laser beam source 211, the second laser beam source 212, and the third laser beam source 213 generates pulse modulated light by pulse modulating the injection current of a DFB semiconductor laser whose oscillation band includes the respective wavelength described above, or by pulse modulating the injection current of a DBR semiconductor laser, or by pulse modulating the output beam of a narrow band fiber laser or a semiconductor laser that performs CW oscillation with a high speed optical modulator such as an EOM or the like.

The amplification unit 220 includes a first fiber amplifier 221 to the incident side of which the output of the first laser beam source 211 is connected, a second fiber amplifier 222 to the incident side of which the output of the second laser beam source 212 is connected, and a third fiber amplifier 223 to the incident side of which the output of the third laser beam source 213 is connected.

The first fiber amplifier 221 is an optical amplifier that amplifies the seed light beam of wavelength $\lambda$=1080 nm outputted from the first laser beam source 211. In concrete terms, a YDFA that has a high gain on this wavelength band and that is capable of outputting an infrared laser beam of high power is preferred for use as the first fiber amplifier 221. The first infrared laser beam of wavelength $\lambda$=1080 nm that has been amplified by the first fiber amplifier 221 is incident into the first optical system I of the wavelength conversion unit 230.

The second fiber amplifier 222 is an optical amplifier that amplifies the seed light beam of wavelength $\lambda$=2000 nm outputted from the second laser beam source 212. In concrete terms, a TDFA that has a high gain on this wavelength band and that is capable of outputting an infrared laser beam of high power is preferred for use as the second fiber amplifier 222. The second infrared laser beam of wavelength $\lambda$=2000 nm that has been amplified by the second fiber amplifier 222 is incident into the second optical system II of the wavelength conversion unit 230.

And the third fiber amplifier 223 is an optical amplifier that amplifies the seed light beam of wavelength $\lambda$=1080 nm outputted from the third laser beam source 213. A YDFA similar to the first fiber amplifier 221 is used. The third infrared laser beam of wavelength $\lambda$=1080 nm that has been amplified by the third fiber amplifier 223 is incident into the third optical system III of the wavelength conversion unit 230.

The first infrared laser beam of wavelength λ=1080 nm that has been outputted from the first fiber amplifier 221 is incident into and is propagated through the first optical system I, and is outputted as the first laser beam. And the second infrared laser beam of wavelength λ=2000 nm that has been outputted from the second fiber amplifier 222 is incident into and is propagated through the second optical system II, and is outputted as the second laser beam. Moreover, the third infrared laser beam of wavelength λ=1080 nm that has been outputted from the third fiber amplifier is incident into and is propagated through the third optical system III, and is outputted as the third laser beam. The first through the third laser beams outputted from these first through third optical systems respectively are combined, and are incident into and propagated through the fourth optical system IV. And the wavelength conversion unit 230 is constituted by the four optical systems, i.e. by the first optical system I, the second optical system II, the third optical system III, and the fourth optical system IV. The wavelength conversion unit 230 of this embodiment principally comprises four wavelength conversion elements 231 through 234.

The third wavelength conversion element 231 and the fourth wavelength conversion element 232 are provided in the first optical system I. In the first optical system I, the first infrared laser beam of wavelength λ=1080 nm and angular frequency $\omega_1$ that is emitted from the first fiber amplifier 221 and is incident upon the first optical system (in the following, in the explanation of this embodiment, this is also sometimes termed the "first fundamental wave") is wavelength converted, by the process of being propagated through the first optical system, to its fourth harmonic wave that has angular frequency four times that of the first fundamental wave (i.e. $4\omega_1$) and wavelength one quarter of that thereof (i.e. λ=270 nm).

And the third wavelength conversion element 231 provided to the first optical system I wavelength converts the first fundamental wave of angular frequency $\omega_1$ (i.e. the first infrared laser beam) that is incident upon this element to its second harmonic wave whose angular frequency is $2\omega_1$. In this embodiment, an LBO crystal is used for the third wavelength conversion element 231, and is used with NCPM at a crystal temperature T of around 400 K. With this third wavelength conversion element 231, by the second harmonic wave generation (SHG) of the first fundamental wave, the second harmonic wave is generated whose angular frequency is twice that of the first fundamental wave (i.e. $2\omega_1$) and whose wavelength is one half of that thereof (i.e. λ=540 nm). At this time, the effective non-linear optical constant of the LBO crystal is high at $d_{eff}$=0.85 pm/V, so that the second harmonic wave of the first fundamental wave is generated at high efficiency. This second harmonic wave generated by the third wavelength conversion element 231 is condensed and is incident upon the fourth wavelength conversion element 232.

The fourth wavelength conversion element 232 wavelength converts the second harmonic wave of angular frequency $2\omega_1$ that is condensed and incident thereupon to the fourth harmonic wave whose angular frequency is $4\omega_1$. In this embodiment, a CLBO crystal is used for the fourth wavelength conversion element 232, and is used with Type I angular phase matching. By second harmonic wave generation of the second harmonic wave by the fourth wavelength conversion element 232, the fourth harmonic wave is generated whose angular frequency is four times that of the first fundamental wave (i.e. $4\omega_1$) and whose wavelength is one quarter of that thereof (i.e. λ=270 nm). At this time, the effective non-linear optical constant of the CLBO crystal is high at $d_{eff}$=0.77 pm/V, so that the fourth harmonic wave of the first fundamental wave is generated at high efficiency.

The fourth harmonic wave that has been generated by the fourth wavelength conversion element 232 is incident upon a dichroic mirror 241 after its beam shape has been waveform shaped by passing through two of the cylindrical lenses described above. The dichroic mirror 241 reflects the fourth harmonic wave of the first infrared laser beam of wavelength 270 nm, while passing the second infrared laser beam of wavelength 2000 nm and the third infrared laser beam of wavelength 1080 nm. And the fourth harmonic wave of the first infrared laser beam is reflected by the dichroic mirror 241, and is condensed and is incident as the first laser beam upon the first wavelength conversion element 233 that is provided in the fourth optical system IV.

The wavelength conversion unit 230 is built without providing any wavelength conversion element to the second optical system II upon which the second infrared laser beam is incident, and to the third optical system III upon which the third infrared beam is incident. A mirror 242 and a dichroic mirror 243 are provided at the final end portions of these optical systems. The dichroic mirror 243 is built to pass the second infrared laser beam of wavelength 2000 nm, while reflecting the third infrared laser beam of wavelength 1080 nm.

The second infrared laser beam that has been reflected by the mirror 242 passes through the dichroic mirror 243. And the third infrared laser beam is reflected by the dichroic mirror 243 and is superimposed over the second infrared laser beam on the same axis. Furthermore, the second and third infrared laser beams pass through the dichroic mirror 241. In this manner, the fourth harmonic wave of the first infrared laser beam (i.e. the first laser beam), the second infrared laser beam (i.e. the second laser beam), and the third infrared laser beam (i.e. the third laser beam) are condensed onto and are incident upon the first wavelength conversion element 233 of the fourth optical system IV, in the state of being superimposed upon the same axis.

The first wavelength conversion element 233 and the second wavelength conversion element 234 are provided to the fourth optical system IV. The three infrared laser beams, i.e. the fourth harmonic wave of wavelength λ=270 nm when the first infrared laser beam is wavelength converted by the process of being propagated through the first optical system I and is incident upon the fourth optical system, the second infrared laser beam of wavelength λ=2000 nm that is propagated through the second optical system and is incident upon the fourth optical system, and the third infrared laser beam of wavelength λ=1080 nm that is propagated through the third optical system and is incident upon the fourth optical system, are wavelength converted into an ultraviolet laser beam of wavelength λ=195 nm by the process of being propagated through the fourth optical system IV.

By sum frequency generation of the fourth harmonic wave of the first infrared laser beam and the second infrared laser beam, the first wavelength conversion element 233 that is provided to the fourth optical system IV generates an earlier stage ultraviolet laser beam whose wavelength is in the ultraviolet region.

In this embodiment, an LBO crystal is used as the first wavelength conversion element 233, and is used with NCPM at a crystal temperature of approximately 340 K. An earlier stage ultraviolet laser beam of wavelength λ=237.9 nm is generated by the first wavelength conversion element 233 by sum frequency generation of the fourth harmonic wave ($4\omega_1$) of the first infrared laser beam whose wavelength λ=270 nm, and the second infrared laser beam whose wavelength $\lambda$=2000 nm. At this time, the effective non-linear optical constant of the LBO crystal $d_{eff}$=0.82 pm/V, and this is high, so that the earlier stage ultraviolet laser beam of wavelength $\lambda$=237.9 nm is generated at high efficiency. The earlier stage ultraviolet laser beam that has been generated by the first wavelength conversion element 233 and the third infrared laser beam that has passed through the first wavelength conversion element 233 are incident upon the second wavelength conversion element 234.

And the second wavelength conversion element 234 generates an ultraviolet laser beam of wavelength 200 nm or less by sum frequency generation of the earlier stage ultraviolet laser beam and the third infrared laser beam. In this embodiment, a CLBO crystal is used as the second wavelength conversion element 234, and this is used with NCPM at a crystal temperature of around 415 K. And an ultraviolet laser beam of wavelength $\lambda$=195 nm is generated by the second wavelength conversion element 234 by sum frequency generation of the earlier stage ultraviolet laser beam whose wavelength $\lambda$=237.9 nm, and the third infrared laser beam whose wavelength $\lambda$=1080 nm. At this time, the effective non-linear optical constant $d_{eff}$ of the CLBO crystal $d_{eff}$=1.10 pm/V, and this is extremely high, so that the ultraviolet laser beam of wavelength $\lambda$=195 nm is generated at high efficiency.

The ultraviolet laser beam of wavelength $\lambda$=195 nm generated by the second wavelength conversion element 234 is outputted at the final end of the fourth optical system. Thus, an ultraviolet laser beam Lv of wavelength $\lambda$=195 nm (i.e. a deep ultraviolet laser beam) is outputted from the wavelength conversion unit 230 (i.e. from the ultraviolet laser device 2).

With the ultraviolet laser device 2 having the structure described above, in addition to the fundamental beneficial effects described above, the following beneficial effects are obtained, in a similar manner to the case with the ultraviolet laser device 1 of the first embodiment. First, in this embodiment, each of the three fiber amplifiers 221 through 223 (i.e. the first through the third fiber amplifiers) that amplify the infrared laser beams is realized as a YDFA and a TDFA that is capable of outputting an infrared laser beam of high power. Due to this, it is possible to implement great increase of the output of this all-solid type ultraviolet laser device that outputs an ultraviolet laser beam of wavelength 195 nm.

Furthermore, with the ultraviolet laser device 2 of this embodiment, the first and second wavelength conversion elements (LBO crystal or CLBO crystal) 233 and 234 for generating the ultraviolet laser beam are used with NCPM, with which neither suffers walk-off. Due to this, wavelength conversion is performed by the wavelength conversion unit 230 at extremely high efficiency, and moreover a high beam quality is obtained. Yet further, it is not necessary to provide any optical element for beam profile shaping to the fourth optical system that generates and outputs a laser beam in the deep ultraviolet region.

In addition, while when the wavelength is 193 nm there is a fear that the absorption ratio may increase abruptly due to variation of the crystal quality, moisture absorption, temperature rise or the like since the wavelength of 193 nm is close to the absorption edge wavelength of the CLBO crystal, by contrast, the operation of this ultraviolet laser device maintains a certain margin, since the wavelength is 195 nm and thus is somewhat separated from the absorption edge wavelength of the CLBO crystal.

Embodiment #3

Figure 3:
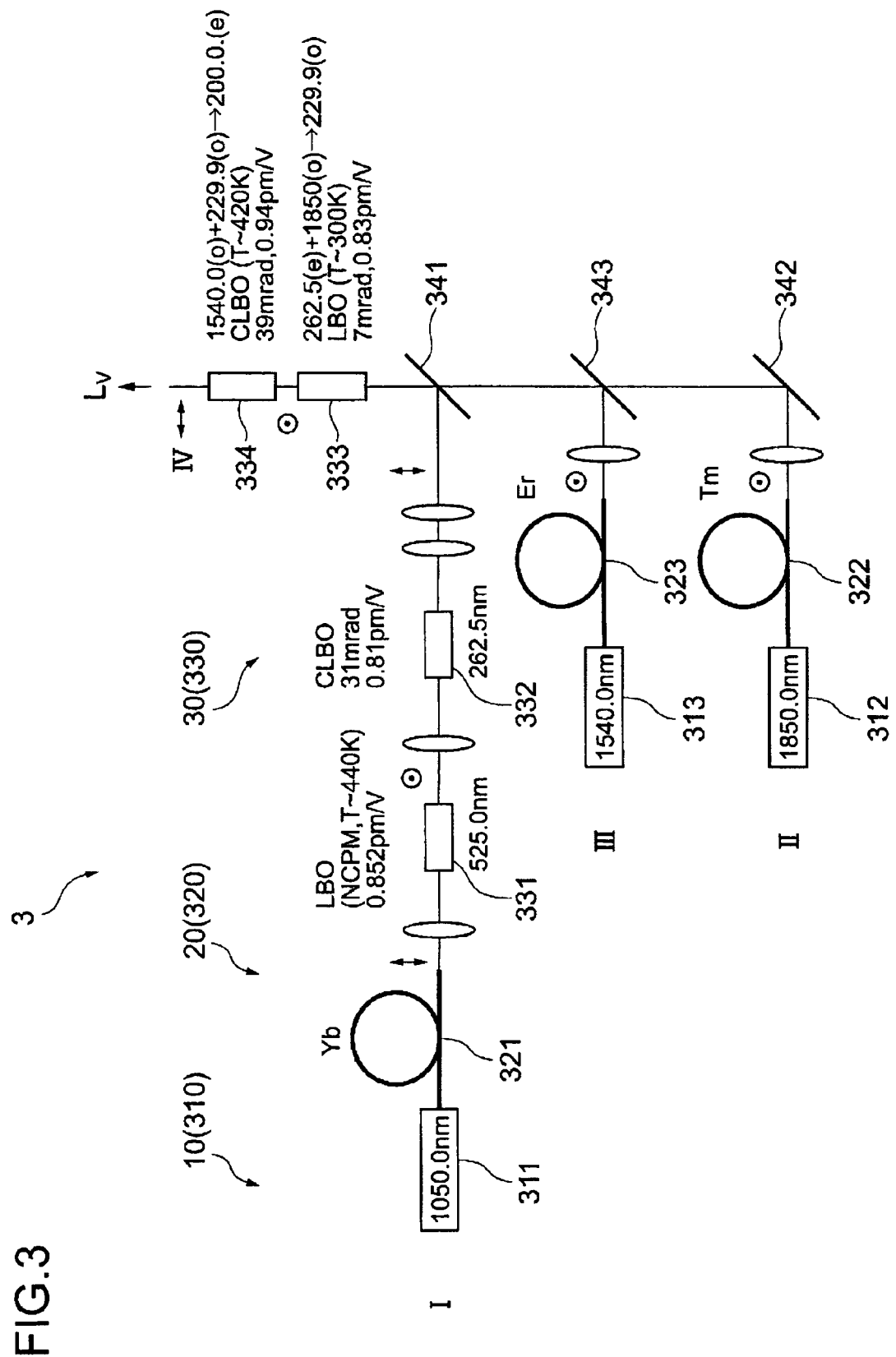
FIG. 3 is a figure showing, as an example, an outline of the structure of an ultraviolet laser device according to a third embodiment.

An ultraviolet laser device 3 of a third embodiment will now be described with reference to FIG. 3. This ultraviolet laser device 3 includes a laser beam generation unit 310 that generates seed light beams, an amplification unit 320 that amplifies the seed light beams generated by the laser beam generation unit 310 and outputs infrared laser beams of predetermined output, and a wavelength conversion unit 330 that wavelength converts the laser beams on infrared wavelengths outputted from the light amplification unit 320 into a laser beam on an ultraviolet wavelength, and this is then outputted.

The laser beam generation unit 310 includes a first laser beam source 311, a second laser beam source 312, and a third laser beam source 313. Each of the first laser beam source 311, the second laser beam source 312, and the third laser beam source 313 generates a seed light beam on an infrared wavelength. In this embodiment, the wavelength $\lambda$ of the seed light beam generated by the first laser beam source 311 is $\lambda$=1050 nm, the wavelength $\lambda$ of the seed light beam generated by the second laser beam source 312 is $\lambda$=1850 nm, and the wavelength $\lambda$ of the seed light beam generated by the third laser beam source 313 is $\lambda$=1540 nm.

Each of the first laser beam source 311, the second laser beam source 312, and the third laser beam source 313, for example, generates pulse modulated light by pulse modulating the injection current of a DFB semiconductor laser whose oscillation band includes the respective wavelength described above, or by pulse modulating the injection current of a DBR semiconductor laser, or by pulse modulating the output beam of a narrow band fiber laser or a semiconductor laser that performs CW oscillation with a high speed optical modulator such as an EOM or the like.

The amplification unit 320 includes a first fiber amplifier 321 to the incident side of which the output of the first laser beam source 311 is connected, a second fiber amplifier 322 to the incident side of which the output of the second laser beam source 312 is connected, and a third fiber amplifier 323 to the incident side of which the output of the third laser beam source 313 is connected.

The first fiber amplifier 321 is an optical amplifier that amplifies the seed light beam of wavelength $\lambda$=1050 nm outputted from the first laser beam source 311. In concrete terms, a YDFA that has a high gain on this wavelength band and that is capable of outputting an infrared laser beam of high power is preferred for use as the first fiber amplifier 321. The first infrared laser beam of wavelength $\lambda$=1050 nm that has been amplified by the first fiber amplifier 321 is incident into the first optical system I of the wavelength conversion unit 330.

The second fiber amplifier 322 is an optical amplifier that amplifies the seed light beam of wavelength $\lambda$=1850 nm outputted from the second laser beam source 312. In concrete terms, a TDFA that has a high gain on this wavelength band and that is capable of outputting an infrared laser beam of high power is preferred for use as the second fiber amplifier 322. The second infrared laser beam of wavelength $\lambda$=1850 nm that has been amplified by the second fiber amplifier 322 is incident into the second optical system II of the wavelength conversion unit 330.

And the third fiber amplifier 323 is an optical amplifier that amplifies the seed light beam of wavelength $\lambda$=1540 nm outputted from the third laser beam source 313. In concrete terms, an EDFA (erbium doped fiber amplifier) that has a high gain on this wavelength band is preferred for use as the third fiber amplifier 323. The third infrared laser beam of wavelength $\lambda$=1540 nm that has been amplified by the third fiber amplifier 323 is incident into the third optical system III of the wavelength conversion unit 330. It can also be desirable to employ an Er:Yb codoped fiber amplifier, in which both erbium (Er) and ytterbium (Yb) are doped to the core, as the third fiber amplifier 323.

The first infrared laser beam of wavelength λ=1050 nm that has been outputted from the first fiber amplifier 321 is incident into and is propagated through the first optical system I, and is outputted as the first laser beam. And the second infrared laser beam of wavelength λ=1850 nm that has been outputted from the second fiber amplifier 322 is incident into and is propagated through the second optical system II, and is outputted as the second laser beam. Moreover, the third infrared laser beam of wavelength λ=1540 nm that has been outputted from the third fiber amplifier is incident into and is propagated through the third optical system III, and is outputted as the third laser beam. The first through the third laser beams outputted from these first through third optical systems respectively are combined, and are incident into and are propagated through the fourth optical system IV. And the wavelength conversion unit 330 is constituted by the four optical systems, i.e. by the first optical system I, the second optical system II, the third optical system III, and the fourth optical system IV. The wavelength conversion unit 330 of this embodiment principally comprises four wavelength conversion elements 331 through 334.

The third wavelength conversion element 331 and the fourth wavelength conversion element 332 are provided in the first optical system I. In the first optical system I, the first infrared laser beam of wavelength λ=1050 nm and angular frequency $\omega_1$ that is emitted from the first fiber amplifier 321 and is incident upon the first optical system (in the following, in the explanation of this embodiment, this is also sometimes termed the "first fundamental wave") is wavelength converted, by the process of being propagated through the first optical system, to its fourth harmonic wave that has angular frequency four times that of the first fundamental wave (i.e. $4\omega_1$) and wavelength one quarter of that thereof (i.e. λ=262.5 nm).

And the third wavelength conversion element 331 provided to the first optical system I wavelength converts the first fundamental wave of angular frequency $\omega_1$ (i.e. the first infrared laser beam) that is incident upon this element to its second harmonic wave whose angular frequency is $2\omega_1$. In this embodiment, an LBO crystal is used for the third wavelength conversion element 331, and is used with NCPM at a crystal temperature T of around 440 K. With this third wavelength conversion element 331, by second harmonic wave generation (SHG) of the first fundamental wave, the second harmonic wave is generated whose angular frequency is twice that of the first fundamental wave (i.e. $2\omega_1$) and whose wavelength is one half of that thereof (i.e. λ=525 nm). At this time, the effective non-linear optical constant of the LBO crystal is high at $d_{eff}$=0.852 pm/V, so that the second harmonic wave of the first fundamental wave is generated at high efficiency. This second harmonic wave generated by the third wavelength conversion element 331 is condensed and is incident upon the fourth wavelength conversion element 332.

The fourth wavelength conversion element 332 wavelength converts the second harmonic wave of angular frequency $2\omega_1$ that is condensed and incident thereupon to the fourth harmonic wave whose angular frequency is $4\omega_1$. In this embodiment, a CLBO crystal is used for the fourth wavelength conversion element 332, and is used with Type I angular phase matching. By second harmonic wave generation of the second harmonic wave by the fourth wavelength conversion element 332, the fourth harmonic wave is generated whose angular frequency is four times that of the first fundamental wave (i.e. $4\omega_1$) and whose wavelength is one quarter of that thereof (i.e. λ=262.5 nm). At this time, the effective non-linear optical constant of the CLBO crystal is high at $d_{eff}$=0.81 pm/V, so that the fourth harmonic wave of the first fundamental wave is generated at high efficiency.

The fourth harmonic wave that has been generated by the fourth wavelength conversion element 332 is incident upon a dichroic mirror 341 after its beam shape has been waveform shaped by two of the cylindrical lenses described above. The dichroic mirror 341 reflects the fourth harmonic wave of the first infrared laser beam of wavelength 262.5 nm, while passing the second infrared laser beam of wavelength 1850 nm and the third infrared laser beam of wavelength 1540 nm. And the fourth harmonic wave of the first infrared laser beam is reflected by the dichroic mirror 341, and is condensed and is incident as the first laser beam upon the first wavelength conversion element 333 that is provided in the fourth optical system IV.

The wavelength conversion unit 330 is built without providing any wavelength conversion element to the second optical system II upon which the second infrared laser beam is incident, and to the third optical system III upon which the third infrared beam is incident. A mirror 342 and a dichroic mirror 343 are provided at the final end portions of these optical systems. The dichroic mirror 343 is built to pass the second infrared laser beam of wavelength 1850 nm, while reflecting the third infrared laser beam of wavelength 1540 nm.

The second infrared laser beam that has been reflected by the mirror 342 passes through the dichroic mirror 343. And the third infrared laser beam is reflected by the dichroic mirror 343 and is superimposed over the second infrared laser beam on the same axis. Furthermore, the second and third infrared laser beams pass through the dichroic mirror 341. In this manner, the fourth harmonic wave of the first infrared laser beam (i.e. the first laser beam), the second infrared laser beam (i.e. the second laser beam), and the third infrared laser beam (i.e. the third laser beam) are condensed onto and are incident upon the first wavelength conversion element 333 of the fourth optical system IV, in the state of being superimposed upon the same axis.

The first wavelength conversion element 333 and the second wavelength conversion element 334 are provided to the fourth optical system IV. The three infrared laser beams, i.e. the fourth harmonic wave ($4\omega_1$) of wavelength λ=262.5 nm when the first infrared laser beam is wavelength converted by the process of being propagated through the first optical system I and is incident upon the fourth optical system, the second infrared laser beam of wavelength λ=1850 nm that is propagated through the second optical system and is incident upon the fourth optical system, and the third infrared laser beam of wavelength λ=1540 nm that is propagated through the third optical system and is incident upon the fourth optical system, are wavelength converted into an ultraviolet laser beam of wavelength λ=200 nm by the process of being propagated through the fourth optical system IV.

By sum frequency generation of the fourth harmonic wave of the first infrared laser beam and the second infrared laser beam, the first wavelength conversion element 333 that is provided to the fourth optical system IV generates an earlier stage ultraviolet laser beam whose wavelength is in the ultraviolet region.

In this embodiment, an LBO crystal is used as the first wavelength conversion element 333, and is used with Type II angular phase matching at a crystal temperature T of approximately 300 K. An earlier stage ultraviolet laser beam of wavelength λ=229.9 nm is generated by the first wavelength conversion element 333 by sum frequency generation of the fourth harmonic wave ($4\omega_1$) of the first infrared laser beam whose wavelength λ=262.5 nm, and the second infrared laser beam whose wavelength λ=1850 nm. At this time, the effective non-linear optical constant of the LBO crystal $d_{eff}$=0.83 pm/V, and this is high, so that the earlier stage ultraviolet laser beam of wavelength λ=229.9 nm is generated at high efficiency. The earlier stage ultraviolet laser beam that has been generated by the first wavelength conversion element 333 and the third infrared laser beam that has passed through the first wavelength conversion element 333 are incident upon the second wavelength conversion element 334.

And the second wavelength conversion element 334 generates an ultraviolet laser beam of wavelength 200 nm or less by sum frequency generation of the earlier stage ultraviolet laser beam and the third infrared laser beam. In this embodiment, a CLBO crystal is used as the second wavelength conversion element 334, and this is used with Type I angular phase matching at a crystal temperature of around 420 K. And an ultraviolet laser beam of wavelength λ=200 nm is generated by the second wavelength conversion element 334 by sum frequency generation of the earlier stage ultraviolet laser beam whose wavelength λ=229.9 nm, and the third infrared laser beam whose wavelength λ=1540 nm. At this time, the effective non-linear optical constant $d_{eff}$ of the CLBO crystal $d_{eff}$=0.94 pm/V, and this is high, so that the ultraviolet laser beam of wavelength λ=200 nm is generated at high efficiency.

The ultraviolet laser beam of wavelength λ=200 nm generated by the second wavelength conversion element 334 is outputted at the final end of the fourth optical system. Thus, an ultraviolet laser beam Lv of wavelength λ=200 nm (i.e. a deep ultraviolet laser beam) is outputted from the wavelength conversion unit 330 (i.e. from the ultraviolet laser device 3).

With the ultraviolet laser device 3 having the structure described above, in addition to the fundamental beneficial effects described above, the following beneficial effects are obtained. First, in this embodiment, two of the three fiber amplifiers 321 through 323 (i.e. the first through the third fiber amplifiers) that amplify the infrared laser beams are realized as a YDFA and a TDFA that is capable of outputting an infrared laser beam of high power. Due to this, it is possible to implement an all-solid type ultraviolet laser device of high output power that outputs an ultraviolet laser beam of wavelength 200 nm.

Furthermore, with the ultraviolet laser device 3 of this embodiment, by using an LBO crystal for the third wavelength conversion optical crystal 333 in order to generate the ultraviolet laser beam, the walk-off angle becomes a small angle of around 7 milliradians, so that the situation becomes close to NCPM. Due to this, the beam quality of the earlier stage ultraviolet laser beam is high, and it is possible to perform wavelength conversion with the second wavelength conversion element 334 of the final stage without passing the laser beam through any optical system for beam profile shaping.

Furthermore, in this embodiment, it is possible to operate this ultraviolet laser device while maintaining a greater margin than in the case of the second embodiment, since the wavelength of the ultraviolet laser beam outputted from the second wavelength conversion element 334 is 200 nm, and this is greatly separated from the absorption edge wavelength of the CLBO crystal.

Yet further, in each of the ultraviolet laser devices 1 through 3 of the first through the third embodiments explained above, it is possible to build the wavelength conversion unit 130, 230, and 330 that output ultraviolet laser beam in the deep ultraviolet region of wavelength 200 nm or less using only four wavelength conversion elements, and this is quite few.

Embodiment #4

Figure 4:
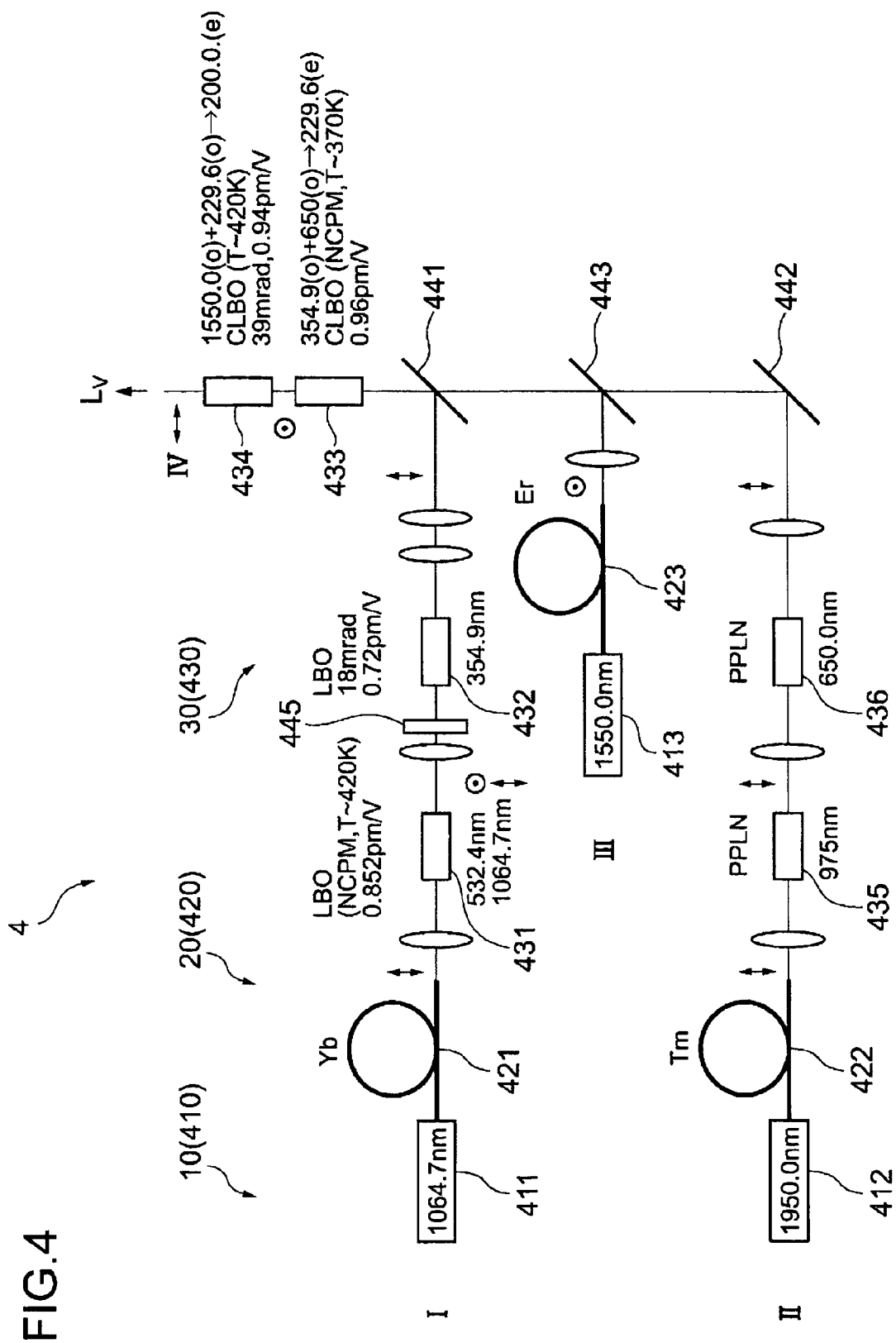
FIG. 4 is a figure showing, as an example, an outline of the structure of an ultraviolet laser device according to a fourth embodiment.

An ultraviolet laser device 4 of a fourth embodiment will now be described with reference to FIG. 4. This ultraviolet laser device 4 includes a laser beam generation unit 410 that generates seed light beams, an amplification unit 420 that amplifies the seed light beams generated by the laser beam generation unit 410 and outputs infrared laser beams of predetermined output, and a wavelength conversion unit 430 that wavelength converts the laser beams on infrared wavelengths outputted from the light amplification unit 420 into a laser beam on an ultraviolet wavelength, and this is then outputted.

The laser beam generation unit 410 includes a first laser beam source 411, a second laser beam source 412, and a third laser beam source 413. Each of the first laser beam source 411, the second laser beam source 412, and the third laser beam source 413 generates a seed light beam on an infrared wavelength. In this embodiment, the wavelength λ of the seed light beam generated by the first laser beam source 411 is λ=1064.7 nm, the wavelength λ of the seed light beam generated by the second laser beam source 412 is λ=1950 nm, and the wavelength λ of the seed light beam generated by the third laser beam source 413 is λ=1550 nm.

Each of the first laser beam source 411, the second laser beam source 412, and the third laser beam source 413, for example, generates pulse modulated light by pulse modulating the injection current of a DFB semiconductor laser whose oscillation band includes the respective wavelength described above, or by pulse modulating the injection current of a DBR semiconductor laser, or by pulse modulating the output beam of a narrow band fiber laser or a semiconductor laser that performs CW oscillation with a high speed optical modulator such as an EOM or the like.

The amplification unit 420 includes a first fiber amplifier 421 to the incident side of which the output of the first laser beam source 411 is connected, a second fiber amplifier 422 to the incident side of which the output of the second laser beam source 412 is connected, and a third fiber amplifier 423 to the incident side of which the output of the third laser beam source 413 is connected.

The first fiber amplifier 421 is an optical amplifier that amplifies the seed light beam of wavelength λ=1064.7 nm outputted from the first laser beam source 411. In concrete terms, a YDFA that has a high gain on this wavelength band and that is capable of outputting an infrared laser beam of high power is preferred for use as the first fiber amplifier 421. The first infrared laser beam of wavelength λ=1064.7 nm that has been amplified by the first fiber amplifier 421 is incident into the first optical system I of the wavelength conversion unit 430.

The second fiber amplifier 422 is an optical amplifier that amplifies the seed light beam of wavelength λ=1950 nm outputted from the second laser beam source 412. In concrete terms, a TDFA that has a high gain on this wavelength band and that is capable of outputting an infrared laser beam of high power is preferred for use as the second fiber amplifier 422. The second infrared laser beam of wavelength λ=1950 nm that has been amplified by the second fiber amplifier 422 is incident into the second optical system II of the wavelength conversion unit 430.

And the third fiber amplifier 423 is an optical amplifier that amplifies the seed light beam of wavelength λ=1550 nm outputted from the third laser beam source 313 [sic]. In concrete terms, an EDFA that has a high gain on this wavelength band is preferred for use as the third fiber amplifier 423. It can also be desirable to employ an Er:Yb codoped fiber amplifier as the third fiber amplifier 423. The third infrared laser beam of wavelength λ=1550 nm that has been amplified by the third fiber amplifier 423 is incident into the third optical system III of the wavelength conversion unit 430.

The first infrared laser beam of wavelength λ=1064.7 nm that has been outputted from the first fiber amplifier 421 is incident into and is propagated through the first optical system I, and is outputted as the first laser beam. And the second infrared laser beam of wavelength λ=1950 nm that has been outputted from the second fiber amplifier 422 is incident into and is propagated through the second optical system II, and is outputted as the second laser beam. Moreover, the third infrared laser beam of wavelength λ=1550 nm that has been outputted from the third fiber amplifier is incident into and is propagated through the third optical system III, and is outputted as the third laser beam. The first through the third laser beams outputted from these first through third optical systems respectively are combined, and are incident into and are propagated through the fourth optical system IV. And the wavelength conversion unit 430 is constituted by the four optical systems, i.e. by the first optical system I, the second optical system II, the third optical system III, and the fourth optical system IV. The wavelength conversion unit 430 of this embodiment principally consists of six wavelength conversion elements 431 through 436.

The third wavelength conversion element 431 and the fourth wavelength conversion element 432 are provided in the first optical system I. In the first optical system, the first infrared laser beam of wavelength λ=1064.7 nm and angular frequency $\omega_1$ that is emitted from the first fiber amplifier 421 and is incident upon the first optical system (in the following, in the explanation of this embodiment, this is also sometimes termed the "first fundamental wave") is wavelength converted, by the process of being propagated through the first optical system, to its third harmonic wave that has angular frequency three times that of the first fundamental wave (i.e. $3\omega_1$) and wavelength one third of that thereof (i.e. λ=354.9 nm).

And the third wavelength conversion element 431 provided to the first optical system I wavelength converts the first fundamental wave of angular frequency $\omega_1$ (i.e. the first infrared laser beam) that is incident upon this element to its second harmonic wave whose angular frequency is $2\omega_1$. In this embodiment, an LBO crystal is used for the third wavelength conversion element 431, and is used with NCPM at a crystal temperature T of around 420 K. With this third wavelength conversion element 431, by second harmonic wave generation (SHG) of the first fundamental wave, the second harmonic wave is generated whose angular frequency is twice that of the first fundamental wave (i.e. $2\omega_1$) and whose wavelength is one half of that thereof (i.e. λ=532.4 nm). At this time, the effective non-linear optical constant of the LBO crystal is high at $d_{eff}$=0.852 pm/V, so that the second harmonic wave of the first fundamental wave is generated at high efficiency.

The second harmonic wave generated by the third wavelength conversion element 431 and the first fundamental wave that has passed through the third wavelength conversion element 431 are condensed onto and incident upon the fourth wavelength conversion element 432 via a dual-wavelength plate 445. While the dual-wavelength plate 445 operates as a λ/2 wavelength plate upon the first fundamental wave of wavelength 1064.7 nm and rotates the plane of polarization of this first fundamental wave through 90°, it operates as a λ wavelength plate upon the second harmonic wave of wavelength 532.4 nm, so that the plane of polarization of this second harmonic wave is left just as it is. Due to this, the polarization state of the first fundamental wave becomes s-polarized light, and this wave is condensed onto and incident upon the fourth wavelength conversion element 432 in the state in which both its first fundamental wave and its second harmonic wave are s-polarized light.

The fourth wavelength conversion element 432 generates the third harmonic wave of angular frequency $3\omega_1$ from the second harmonic wave of angular frequency $2\omega_1$ and the first fundamental wave of angular frequency $\omega_1$ that are condensed and incident thereon. In this embodiment, an LBO crystal is used for the fourth wavelength conversion element 432, and is used with Type I angular phase matching. The third harmonic wave whose angular frequency is three times that of the first fundamental wave and whose wavelength is one third of that thereof (λ=354.9 nm) is generated by the fourth wavelength conversion element 432 by sum frequency generation (SFG) of the first fundamental wave ($\omega_1$) that has passed through the third wavelength conversion element 431 and the second harmonic wave ($2\omega_1$) that has been generated by the third wavelength conversion element 431. The effective non-linear optical constant of the LBO crystal at this time is $d_{eff}$=0.72 pm/V, so that the third harmonic wave of the first fundamental wave is generated at comparatively high efficiency.

The third harmonic wave that has been generated by the fourth wavelength conversion element 432 is incident upon a dichroic mirror 441 after its beam shape has been waveform shaped by passing through two of the cylindrical lenses described above. The dichroic mirror 441 reflects the third harmonic wave ($3\omega_1$) of the first infrared laser beam of wavelength 354.9 nm, while passing the second infrared laser beam of wavelength 1950 nm and the third infrared laser beam of wavelength 1550 nm. And the third harmonic wave of the first infrared laser beam is reflected by the dichroic mirror 441, and is condensed and is incident as the first laser beam upon the first wavelength conversion element 433 that is provided in the fourth optical system IV.

The fifth wavelength conversion element 435 and the sixth wavelength conversion element 436 are provided to the second optical system II. By the process of being propagated through the second optical system, the second infrared laser beam of wavelength λ=1950 nm and angular frequency $\omega_2$ that is emitted from the second fiber amplifier 422 and is incident upon the second optical system (hereinafter, in the explanation of this embodiment, this will also sometimes be termed the "second fundamental wave") is wavelength converted by the second optical system II into its third harmonic wave whose angular frequency is three times that of the second fundamental wave ($\omega_2$) and whose wavelength is one third of that thereof (λ=650 nm).

The fifth wavelength conversion element 435 that is provided to the second optical system II wavelength converts the second fundamental wave of angular frequency $\omega_2$ (i.e. the second infrared laser beam) that is incident upon this element into its second harmonic wave of angular frequency $2\omega_2$. In this embodiment, a PPLN (i.e. a LiNbO$_3$ crystal made with a periodically polarization inversion structure) is used for this fifth wavelength conversion element 435. The second harmonic wave whose angular frequency is twice that of the second fundamental wave ($2\omega_2$) and whose wavelength is half of that thereof (λ=975 nm) is generated by the fifth wavelength conversion element 435 by second harmonic wave generation (SHG) of the second fundamental wave. The second harmonic wave ($2\omega_2$) generated by the fifth wavelength conversion element 435 and the second fundamental wave ($\omega_2$) that has passed through the fifth wavelength conversion element 435 are condensed onto and incident upon the sixth wavelength conversion element 436.

The sixth wavelength conversion element 436 generates the third harmonic wave whose angular frequency is $3\omega_2$ from the second harmonic wave of angular frequency $2\omega_2$ and the second fundamental wave of angular frequency $\omega_2$ that are condensed and incident thereupon. In this embodiment, a PPLN is used for the sixth wavelength conversion element 436. The third harmonic wave whose angular frequency is three times that of the second fundamental wave ($3\omega_2$) and whose wavelength is one third of that thereof ($\lambda$=650 nm) is generated by the sixth wavelength conversion element 436 by sum frequency generation (SFG) of the second fundamental wave ($\omega_2$) that has passed through the fifth wavelength conversion element 435 and the second harmonic wave ($2\omega_2$) that has been generated by the fifth wavelength conversion element 435. And this third harmonic wave ($3\omega_2$) of the second infrared laser beam is reflected by the mirror 442, and is incident upon the dichroic mirror 443.

It would also be acceptable for the mirror 442 to be a dichroic mirror. In this case, if the transmission wavelength of the dichroic mirror is set to around 700 nm and greater (so that its reflection wavelength is 700 nm and less), so that it is arranged for the dichroic mirror to pass the fundamental wave of the second infrared laser beam and its second harmonic wave so that they are absorbed by an optical absorber, then it is possible to prevent laser light beams of wavelengths that are not required from being incident upon the wavelength conversion element of the fourth optical system IV.

The third optical system III is built without providing any wavelength conversion element; rather, a dichroic mirror 443 is provided at the final end portions of this third optical system. The dichroic mirror 443 is built to pass the third harmonic wave ($3\omega_2$) of the second infrared laser beam of wavelength 650 nm, while reflecting the third infrared laser beam of wavelength 1550 nm.

The third harmonic wave ($3\omega_2$) of the second infrared laser beam that has been turned by the mirror 442 passes through the dichroic mirror 443. And the third infrared laser beam of the third optical system is reflected by the dichroic mirror 443 and is superimposed over the third harmonic wave of the second infrared laser beam on the same axis. These laser beams pass through the dichroic mirror 441. In this manner, the third harmonic wave of the first infrared laser beam (i.e. the first laser beam), the third harmonic wave of the second infrared laser beam (i.e. the second laser beam), and the third infrared laser beam (i.e. the third laser beam) are condensed onto and are incident upon the first wavelength conversion element 433 of the fourth optical system IV, in the state of being superimposed upon the same axis.

The first wavelength conversion element 433 and the second wavelength conversion element 434 are provided to the fourth optical system IV. The three infrared laser beams, i.e. the third harmonic wave ($3\omega_1$) of wavelength $\lambda$=354.9 nm when the first infrared laser beam is wavelength converted by the process of being propagated through the first optical system I and is incident upon the fourth optical system, the third harmonic wave ($3\omega_2$) of wavelength $\lambda$=650 nm when the second infrared laser beam is wavelength converted by the process of being propagated through the second optical system II and is incident upon the fourth optical system, and the third infrared laser beam of wavelength $\lambda$=1550 nm that is propagated through the third optical system III and is incident upon the fourth optical system, are wavelength converted into an ultraviolet laser beam of wavelength $\lambda$=200 nm by the process of being superimposed and propagated through the fourth optical system IV.

By sum frequency generation of the third harmonic wave ($3\omega_1$) of the first infrared laser beam and the third harmonic wave ($3\omega_2$) of the second infrared laser beam, the first wavelength conversion element 433 that is provided to the fourth optical system IV generates an earlier stage ultraviolet laser beam whose wavelength is in the ultraviolet region.

In this embodiment, a CLBO crystal is used as the first wavelength conversion element 433, and is used with NCPM at a crystal temperature T of approximately 370 K. An earlier stage ultraviolet laser beam of wavelength $\lambda$=229.6 nm is generated by the first wavelength conversion element 433 by sum frequency generation of the third harmonic wave ($3\omega_1$) of the first infrared laser beam whose wavelength $\lambda$=354.9 nm, and the third harmonic wave ($3\omega_2$) of the second infrared laser beam whose wavelength $\lambda$=650 nm. At this time, the effective non-linear optical constant of the CLBO crystal $d_{eff}$=0.96 pm/V, and this is high, so that the earlier stage ultraviolet laser beam of wavelength $\lambda$=229.6 nm is generated at high efficiency. The earlier stage ultraviolet laser beam that has been generated by the first wavelength conversion element 433 and the third infrared laser beam that has passed through the first wavelength conversion element 433 are incident upon the second wavelength conversion element 434.

And the second wavelength conversion element 434 generates an ultraviolet laser beam of wavelength around 200 nm or less by sum frequency generation of the earlier stage ultraviolet laser beam and the third infrared laser beam. In this embodiment, a CLBO crystal is used as the second wavelength conversion element 434, and this is used with Type I angular phase matching at a crystal temperature of around 420 K. And an ultraviolet laser beam of wavelength $\lambda$=200 nm is generated by the second wavelength conversion element 434 by sum frequency generation of the earlier stage ultraviolet laser beam whose wavelength $\lambda$=229.6 nm, and the third infrared laser beam whose wavelength $\lambda$=1550 nm. At this time, the effective non-linear optical constant $d_{eff}$ of the CLBO crystal $d_{eff}$=0.94 pm/V, and this is high, so that the ultraviolet laser beam of wavelength $\lambda$=200 nm is generated at high efficiency.

The ultraviolet laser beam of wavelength $\lambda$=200 nm generated by the second wavelength conversion element 434 is outputted at the final end of the fourth optical system IV. Thus, an ultraviolet laser beam Lv of wavelength $\lambda$=200 nm (i.e. a deep ultraviolet laser beam) is outputted from the wavelength conversion unit 430 (i.e. from the ultraviolet laser device 4).

With the ultraviolet laser device 4 having the structure described above, in addition to the fundamental beneficial effects described above, the following beneficial effects are obtained. First, in this embodiment, two of the three fiber amplifiers 421 through 423 (i.e. the first through the third fiber amplifiers) that amplify the infrared laser beams are realized as a YDFA and a TDFA that are capable of outputting infrared laser beams of high power. Due to this, it is possible to implement an all-solid type ultraviolet laser device of high output power that outputs an ultraviolet laser beam of wavelength 200 nm.

Furthermore, with the ultraviolet laser device 4 of this embodiment, it is possible to arrive at NCPM by using a CLBO crystal for the third wavelength conversion optical crystal 433 in order to generate the ultraviolet laser beam. Due to this, the beam quality of the earlier stage ultraviolet laser beam is high, and it is possible to perform wavelength conversion with the second wavelength conversion element 434 of the final stage without passing the laser beam through any optical system for beam profile shaping.

Furthermore, in this embodiment, it is possible to operate this ultraviolet laser device while maintaining a yet greater margin than in the case of the second embodiment, since the wavelength of the ultraviolet laser beam outputted from the second wavelength conversion element 434 is 200 nm, and this is greatly separated from the absorption edge wavelength of the CLBO crystal.

The ultraviolet laser devices 1 through 4 according to the various modes of implementation of the present invention described above are capable of outputting ultraviolet laser beams of high power output. Moreover, according to the present invention, it is possible to provide an ultraviolet laser device that is capable of increased power output, without providing any optical element for mode waveform shaping in the ultraviolet wavelength region.

This type of ultraviolet laser device is simple to manage along with being compact and light in weight, and, for example, may be appropriately applied to an observation device such as a microscope or a telephoto mirror or the like, to a measurement device such as a distance measuring device or a shape measurement device or the like, to an optical processing device such as a laser beam manufacturing device or an exposure device or the like, or to an inspection device or a therapy device or the like.

While in the above description various embodiments and variant embodiments have been explained, the present invention is not to be considered as being limited by the details thereof. Other modes that are considered to be within the range of the technical concept of the present invention are also included within the scope of the present invention.

The disclosure of the following priority application is herein incorporated by reference:
Japanese Patent Application No. 2010-138115 (filed on Jun. 17, 2010).

The invention claimed is:

1. An ultraviolet laser device, comprising:
a laser beam output unit that includes a first fiber amplifier, a second fiber amplifier, and a third fiber amplifier that respectively output a first infrared laser beam, a second infrared laser beam, and a third infrared laser beam at infrared wavelengths; and
a wavelength conversion unit that includes a first optical system into which the first infrared laser beam is incident and through which the first infrared laser beam is propagated and outputted as a first laser beam, a second optical system into which the second infrared laser beam is incident and through which it is propagated and outputted as a second laser beam, a third optical system into which the third infrared laser beam is incident and through which it is propagated and outputted as a third laser beam, and a fourth optical system into which the first laser beam, the second laser beam, and the third laser beam that have respectively been outputted from the first optical system, the second optical system, and the third optical system are incident after having been combined, and through which they are propagated, wherein:
the first fiber amplifier is an ytterbium doped fiber amplifier;
the second fiber amplifier is a thulium doped fiber amplifier;
the third fiber amplifier is an ytterbium doped fiber amplifier or an erbium doped fiber amplifier;
the first optical system wavelength converts the first infrared laser beam to a predetermined harmonic wave, and generates the predetermined harmonic wave as the first laser beam;
the fourth optical system includes a first wavelength conversion element and a second wavelength conversion element;
the first wavelength conversion element generates an earlier stage ultraviolet laser beam in the ultraviolet region by sum frequency generation between the predetermined harmonic wave and the second laser beam; and
the second wavelength conversion element generates an ultraviolet laser beam by sum frequency generation between the earlier stage ultraviolet laser beam and the third laser beam.

2. The ultraviolet laser device according to claim 1, wherein the third fiber amplifier is an ytterbium doped fiber amplifier.

3. The ultraviolet laser device according to claim 1, wherein the third fiber amplifier is an erbium doped fiber amplifier.

4. The ultraviolet laser device according to claim 1, wherein the predetermined harmonic wave is a fourth harmonic wave whose angular frequency is four times that of the first infrared laser beam and whose wavelength is a quarter that of the first infrared laser beam.

5. The ultraviolet laser device according to claim 1, wherein:
the predetermined harmonic wave is a first third harmonic wave whose angular frequency is three times that of the first infrared laser beam and whose wavelength is a third that of the first infrared laser beam;
the second optical system wavelength converts the second infrared laser beam into a second third harmonic wave whose angular frequency is three times that of the second infrared laser beam and whose wavelength is a third that of the second infrared laser beam, and generates the second third harmonic wave as the second laser beam;
the first wavelength conversion element generates the earlier stage ultraviolet laser beam by sum frequency generation of the first third harmonic wave and the second third harmonic wave; and
the second wavelength conversion element generates the ultraviolet laser beam by sum frequency generation of the earlier stage ultraviolet laser beam and the third laser beam.

6. The ultraviolet laser device according to claim 1, wherein:
the first wavelength conversion element is an LBO crystal; and
the second wavelength conversion element is a CLBO crystal.

7. The ultraviolet laser device according to claim 1, wherein the first wavelength conversion element and the second wavelength conversion element are CLBO crystals.

* * * * *